United States Patent
Hasegawa et al.

(10) Patent No.: US 12,437,826 B2
(45) Date of Patent: Oct. 7, 2025

(54) SELF TIMING TRAINING USING MAJORITY DECISION MECHANISM

(71) Applicant: Micron Technology, Inc., Boise, ID (US)

(72) Inventors: Takehiro Hasegawa, Kanagawa (JP); Chikara Kondo, Kanagawa (JP); Yuan He, Boise, ID (US); Hyunui Lee, Seoul (KR)

(73) Assignee: Micron Technology, Inc., Boise, ID (US)

(*) Notice: Subject to any disclaimer, the term of this patent is extended or adjusted under 35 U.S.C. 154(b) by 85 days.

(21) Appl. No.: 17/385,340

(22) Filed: Jul. 26, 2021

(65) Prior Publication Data

US 2023/0029528 A1    Feb. 2, 2023

(51) Int. Cl.
  *G11C 29/12* (2006.01)
  *G11C 7/22* (2006.01)

(52) U.S. Cl.
  CPC ........ *G11C 29/12015* (2013.01); *G11C 7/222* (2013.01)

(58) Field of Classification Search
  CPC . G11C 29/12015; G11C 29/023; G11C 7/222; G11C 7/1093; G11C 7/1066
  See application file for complete search history.

(56) References Cited

U.S. PATENT DOCUMENTS

| | | | | |
|---|---|---|---|---|
| 7,508,893 B1* | 3/2009 | Gan | ....................... | G11C 27/02 375/355 |
| 7,817,767 B2* | 10/2010 | Tell | ....................... | H03L 7/093 375/376 |
| 7,991,099 B2* | 8/2011 | Xia | ....................... | H04L 7/0337 375/259 |
| 8,819,474 B2 | 8/2014 | Schoenborn et al. | | |
| 2006/0034394 A1* | 2/2006 | Popescu | .................. | H04L 7/033 375/360 |
| 2007/0217559 A1* | 9/2007 | Stott | ..................... | H04L 7/0008 375/355 |
| 2012/0173924 A1* | 7/2012 | Xiao | ..................... | H03M 13/13 714/15 |
| 2013/0201779 A1* | 8/2013 | Wen | ..................... | G11C 29/023 365/233.13 |

* cited by examiner

*Primary Examiner* — Mark D Featherstone
*Assistant Examiner* — Rong Tang
(74) *Attorney, Agent, or Firm* — TraskBritt

(57) ABSTRACT

Methods for improving timing in memory devices are disclosed. A method may include sampling a data signal according to a clock signal to obtain a data sample; sampling the data signal according to an advanced clock signal to obtain an advanced data sample; and sampling the data signal according to a delayed clock signal to obtain a delayed data sample. The method may also include comparing the data sample with the advanced data sample and the delayed data sample and performing an action based on the comparison. The action may include selecting a data sample, selecting a clock signal and/or adjusting a clock signal. Associated devices and systems are also disclosed.

19 Claims, 10 Drawing Sheets

SELF TIMING TRAINING USING MAJORITY DECISION MECHANISM

TECHNICAL FIELD

Embodiments of the disclosure relate to improving timing in memory devices. More specifically, various embodiments relate to timing alignment for data-signal sampling. In particular, various embodiments relate to selecting data samples, selecting clock signals, and/or adjusting timings of clock signals to align with data signals. Additionally, embodiments include related methods, devices, and systems.

BACKGROUND

Memory devices are typically provided as internal, semiconductor, integrated circuits in computers or other electronic systems. There are many different types of memory including, for example, random-access memory (RAM), read-only memory (ROM), dynamic random-access memory (DRAM), synchronous dynamic random-access memory (SDRAM), resistive random-access memory (RRAM), double-data-rate memory (DDR), low-power double-data-rate memory (LPDDR), phase-change memory (PCM), and Flash memory.

Memory devices may be configured to, among other things, sample data signals (including e.g., command signals, address signals, and/or data input signals) according to a clock signal. Additionally or alternatively, memory devices may be configured to provide data signals (e.g., data output signals) according to a clock signal. Temporal alignment between a clock signal and data signals may be important to accurately sample (and/or provide) the data signals.

BRIEF DESCRIPTION OF THE SEVERAL VIEWS OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

Each of FIG. 2A, FIG. 2B.

DETAILED DESCRIPTION

Figure 1:
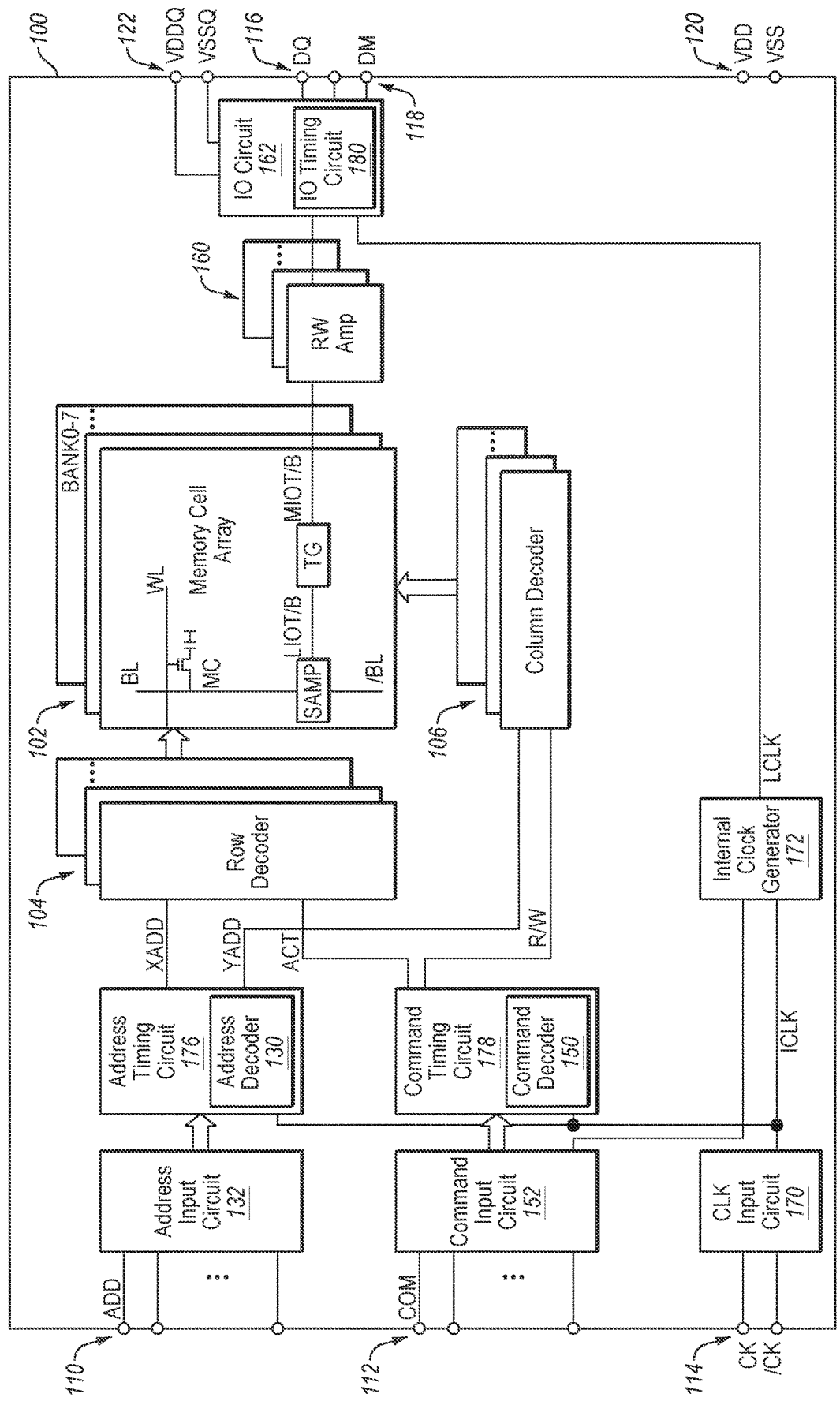
FIG. 1 is a functional block diagram illustrating an example memory device, in accordance with at least one embodiment of the disclosure.

A data signal may include transition times during which the data signal transitions between values (e.g., a logical high value and a logical low value). The transition times may occur at repeated intervals. The data signal may be sampled according to a clock signal. In particular, at sampling times indicated by the clock signal, data samples may be taken from the data signal.

It may be important to align the clock signal with the data signal such that sampling times do not overlap with the transition times. Taking a data sample during a transition time may result in an indeterminate or incorrect data sample (i.e., a data sample that does not match a value of the data signal that was intended to be read at a given time). Thus accurate alignment between the timing of the clock signal and the data signal may provide for accurate sampling of the data signal.

Timing of a data signal and/or a clock signal may drift over time (e.g., the data signal and/or the clock signal may advance or delay over time). Such drift may be the result of temperature changes, voltage changes, and/or noise. Drift of the data signal and/or the clock signal may result in misalignment of the data signal and the clock signal. Misalignment of the data signal with the clock signal may result in sampling incorrect data samples.

Various embodiments may increase the accuracy of data sampling by, for example, providing multiple data samples and selecting correct data samples, providing multiple clock signals and selecting a clock signal that provides correct data samples, and/or adjusting a timing of clock signals and/or data signals.

One or more embodiments may be employed during data sampling and/or without interrupting data sampling. For example, a memory device may employ one of more embodiments while memory operations (e.g., reading and/or writing values at the memory device) are ongoing at the memory device and without interrupting the ongoing memory operations. This may be particularly useful considering that drift may occur during the ongoing memory operations.

In some embodiments, three data samples are obtained, e.g., an advanced data sample, a data sample, and a delayed data sample. The data samples are compared. A data sample that has the same value as a majority of data samples is selected and/or output as a verified data sample.

In some embodiments, three clock signals are obtained e.g., an advanced clock signal, a clock signal, and a delayed clock signal. A data sample is taken according to each of the three clock signals, e.g., an advanced data sample is obtained according to the advanced clock signal, a data sample is obtained according to the clock signal, and a delayed data sample is obtained according to the delayed clock signal. The data samples are compared. A clock signal is selected for future sampling based on the comparison. For example, if the advanced data sample and the data sample are the same and the delayed data sample is different, either of the advanced clock signal or the clock signal may be selected for future data sampling. As another example, if the data sample and the delayed data sample are the same and the advanced data sample is different, either of the clock signal or the delayed clock signal may be selected for future data sampling.

In some embodiments, three clock signals are obtained e.g., an advanced clock signal, a clock signal, and a delayed clock signal. A data sample is taken according to each of the three clock signals, e.g., an advanced data sample is obtained according to the advanced clock signal, a data sample is obtained according to the clock signal, and a delayed data sample is obtained according to the delayed clock signal. The data samples are compared. One or more of the advanced clock signal, the clock signal, and the delayed clock signal is adjusted based on the comparison. For example, if the advanced data sample and the data sample are the same and the delayed data sample is different, one or more of the advanced clock signal, the clock signal, and the delayed clock may be advanced for future data sampling. As another example, if the data sample and the delayed data sample are the same and the advanced data sample is different, one or more of the advanced clock signal, the clock signal, and the delayed clock may be delayed for future data sampling.

Although various embodiments are described herein with reference to memory devices, the disclosure is not so limited, and the embodiments may be generally applicable to microelectronic systems and/or semiconductor devices that may or may not include memory devices. Embodiments of the disclosure will now be explained with reference to the accompanying drawings.

FIG. 1 is a functional block diagram illustrating an example memory device 100, in accordance with at least one embodiment of the disclosure. Memory device 100 may include, for example, a DRAM (dynamic random-access memory), a SRAM (static random-access memory), a SDRAM (synchronous dynamic random-access memory), a DDR SDRAM (double-data-rate SDRAM, such as a DDR4 SDRAM and the like), a SGRAM (synchronous graphics random access memory) or a three-dimensional (3D) DRAM. Memory device 100, which may be integrated on a semiconductor chip, may include a memory array 102.

In the embodiment of FIG. 1, memory array 102 is shown as including eight memory banks BANK0-7. More or fewer banks may be included in memory array 102 of other embodiments. Each memory bank includes a number of access lines (word lines WL), a number of data lines (bit lines BL and/BL), and a number of memory cells MC arranged at intersections of the number of word lines WL and the number of bit lines BL and/BL. The selection of a word line WL may be performed by a row decoder 104 and the selection of the bit lines BL and/BL may be performed by a column decoder 106. In the embodiment of FIG. 1, row decoder 104 may include a respective row decoder for each memory bank BANK0-7, and column decoder 106 may include a respective column decoder for each memory bank BANK0-7.

Bit lines BL and/BL are coupled to a respective sense amplifier SAMP. Read data from bit line BL or/BL may be amplified by sense amplifier SAMP, and transferred to read/write amplifiers 160 over complementary local data lines (LIOT/B), a transfer gate (TG), and complementary main data lines (MIOT/B). Conversely, write data outputted from read/write amplifiers 160 may be transferred to sense amplifier SAMP over the complementary main data lines MIOT/B, transfer gate TG, and complementary local data lines LIOT/B, and written in the memory cell MC coupled to bit line BL or/BL.

Memory device 100 may be generally configured to be receive various inputs (e.g., from an external controller or host) via various terminals, such as address terminals 110, command terminals 112, clock terminals 114, data terminals 116, and data mask terminals 118. Memory device 100 may include additional terminals such as a power supply terminal 120 and a power supply terminal 122.

During a contemplated operation, one or more command signals COM, received via command terminals 112, may be conveyed to a command decoder 150 via a command input circuit 152. Command decoder 150 may include a circuit configured to generate various internal commands via decoding the one or more command signals COM. Examples of the internal commands include an active command ACT and a read/write signal R/W.

Further, one or more address signals ADD, received via address terminals 110, may be conveyed to an address decoder 130 via an address input circuit 132. Address decoder 130 may be configured to supply a row address XADD to row decoder 104 and a column address YADD to column decoder 106. Although command input circuit 152 and address input circuit 132 are illustrated as separate circuits, in some embodiments, address signals and command signals may be received via a common circuit.

An active command ACT may include a pulse signal that is activated in response to a command signal COM indicating row access (e.g., an active command). In response to active signal ACT, row decoder 104 of a specified bank address may be activated. As a result, the word line WL specified by row address XADD may be selected and activated.

Read/write signal R/W may include a pulse signal that is activated in response to a command signal COM indicating column access (e.g., a read command or a write command). In response to read/write signal R/W, column decoder 106 may be activated, and bit line BL specified by the column address YADD may be selected.

In response to active command ACT, a read signal, a row address XADD, and a column address YADD, data may be read from the memory cell MC specified by row address XADD and column address YADD. The read data may be output via sense amplifier SAMP, transfer gate TG, read/write amplifiers 160, an input/output circuit 162, and data terminals 116. Further, in response active command ACT, a write signal, a row address XADD, and a column address YADD, write data may be supplied to memory array 102 via data terminals 116, input/output circuit 162, read/write amplifiers 160, transfer gate TG, and sense amplifier SAMP. The write data may be written to the memory cell MC specified by row address XADD and column address YADD.

Clock signals CK and/CK may be received via clock terminals 114. A CLK Input circuit 170 may generate internal clock signals ICLK based on the clock signals CK and/CK. Internal clock signals ICLK may be conveyed to various components of memory device 100, such as command decoder 150, address decoder 130, and an internal clock generator 172. Internal clock generator 172 may generate internal clock signals LCLK, which may be conveyed to input/output circuit 162 (e.g., for controlling the operation timing of input/output circuit 162). Further, data mask terminals 118 may receive one or more data mask signals DM. When the data mask signal DM is activated, overwrite of corresponding data may be prohibited.

Memory device 100 may further include one or more timing circuits, e.g., address timing circuit 176, command timing circuit 178, and/or IO timing circuit 180. The timing circuits may be configured to correct data samples and/or adjust timing signals to provide for correct data samples. For example, command decoder 150 may be configured to sample one or more command signals COM according to ICLK to identify commands (e.g., ACT and/or R/W). Command timing circuit 178 may be configured to correct the identified commands, and/or adjust ICLK (at least internal to command timing circuit 178) such that the identified commands are correct. As another example, address decoder 130 may be configured to sample one or more address signals from address input circuit 132 according to ICLK to identify addresses (e.g., XADD and YADD). Address timing circuit 176 may be configured to correct the identified addresses, and/or adjust ICLK (at least internal to address timing circuit 176) such that the identified addresses are correct. As another example, 10 timing circuit 180 may be configured to sample inputs and/or provide outputs according to LCLK. 10 timing circuits 180 may be configured to correct the identified inputs, and/or adjust LCLK (at least internal to 10 timing circuit 180) such that the identified inputs are correct. Additionally or alternatively, IO timing circuits 180 may be configured to correct outputs, and/or adjust LCLK (at least internal to IO timing circuit 180) such that the outputs are correct and/or outputs align with a clock signal and are correctly interpretable by a receiver.

Figure 2A:
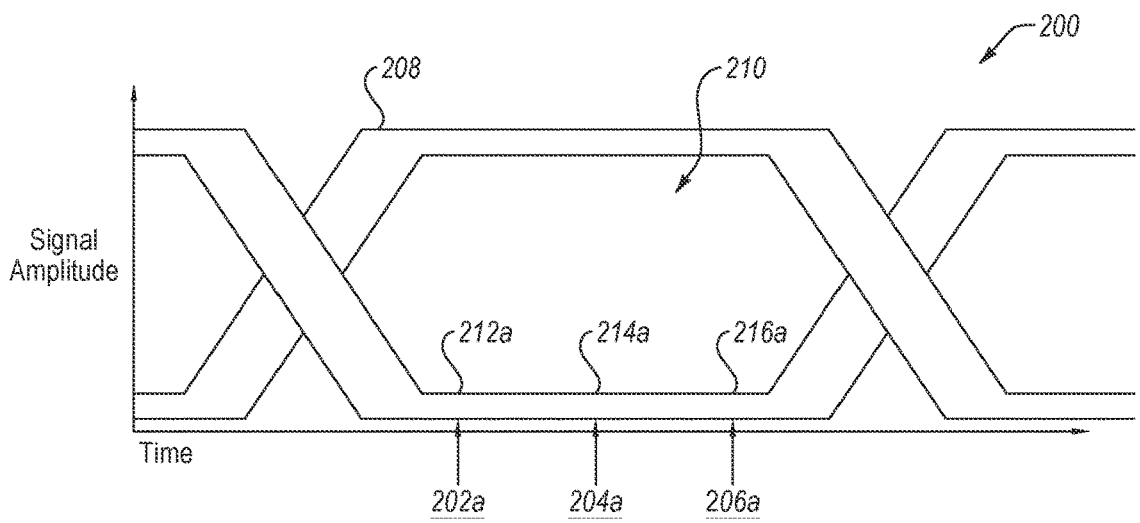
FIG. 2C is a diagram illustrating a relationship between an example data signal and example sampling times in accordance with at least one embodiment of the disclosure.
Figure 2B:
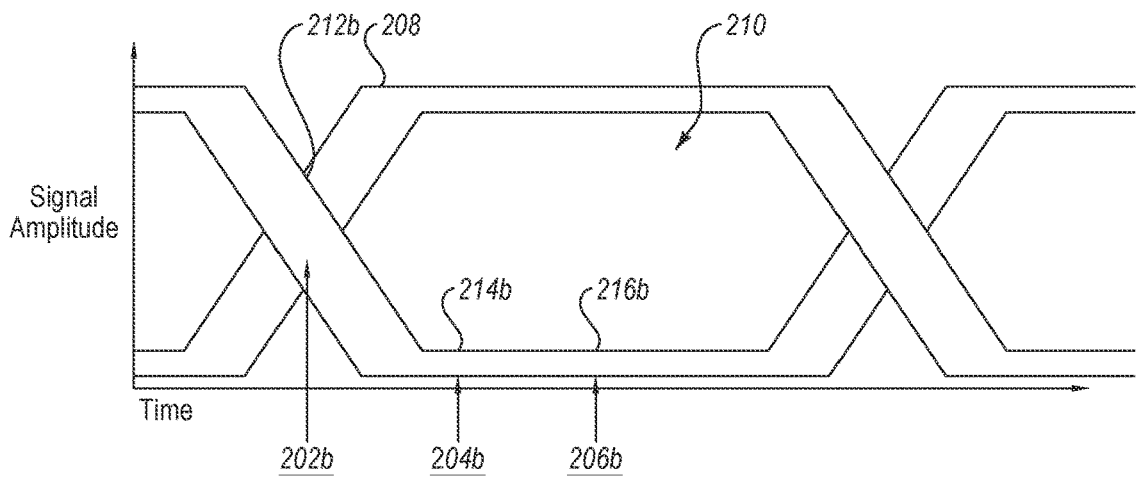
Figure 2C:
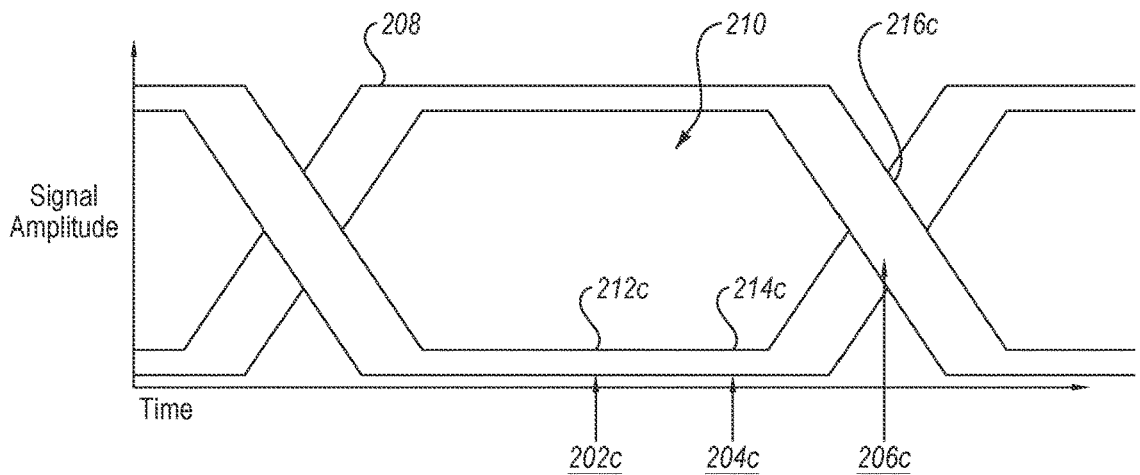

Each of FIG. 2A, FIG. 2B, and FIG. 2C is a diagram illustrating a relationship between an example data signal and example sampling times in accordance with at least one embodiment of the disclosure. In particular, each of FIG. 2A, FIG. 2B, and FIG. 2C illustrate a relationship between a data signal 208 and an advanced sampling time (collectively referred to as advanced sampling times 202 or individually as advanced sampling time 202a in FIG. 2A, advanced sampling time 202b in FIG. 2B, and advanced sampling time 202c in FIG. 2C), a sampling time (collectively referred to as sampling times 204 or individually as sampling time 204a in FIG. 2A, sampling time 204b in FIG. 2B, and sampling time 204c in FIG. 2C) and a delayed sampling time (collectively referred to as delayed sampling times 206 or individually as delayed sampling time 206a in FIG. 2A, delayed sampling time 206b in FIG. 2B, and delayed sampling time 206c in FIG. 2C).

Each of the sampling times may be according to a respective clock signal, e.g., each of the sampling times may occur responsive to a clock edge of a respective clock signal. For example, advanced sampling times 202 may occur responsive to a clock edge of an advanced clock signal. As another example, sampling times 204 may occur responsive to a clock edge of a clock signal. As another example, delayed sampling times 206 may occur responsive to a clock edge of a delayed clock signal.

Data signal 208 exhibits data eye 210, which is a representation of a timing of data signal 208, e.g., a timing between transition times on one or more data lines of data signal 208. Data signal 208 may be a command signal (e.g., COM of FIG. 1), an address signal (e.g., ADD of FIG. 1), or an input signal (e.g., at DQ of FIG. 1).

Sampling may occur during a duration of time during which charge is transferred e.g., a setup-and-hold time. An overlap between a setup-and-hold time and a transition time may result in an incorrect sample. Data sampling may be improved by sampling during a center of data eye 210 and/or closer to a center of data eye 210 rather than closer to one of the transition times.

FIG. 2A illustrates example sampling times (advanced sampling time 202a, sampling time 204a, and delayed sampling time 206a) in relation to data eye 210. Advanced sampling time 202a may be according to an advanced clock signal, sampling time 204a may be according to a clock signal, and delayed sampling time 206a may be according to a delayed clock signal. In the example timing illustrated in FIG. 2A, sampling according to any of advanced sampling time 202a, sampling time 204a, or delayed sampling time 206a may provide a data sample with the same value. For example, advanced data sample 212a, data sample 214a, and delayed data sample 216a (which are data samples taken according to advanced sampling time 202a, sampling time 204a, and delayed sampling time 206a respectively) may have the same value.

However, an advanced data sample, a data sample, and a delayed data sample may not always have the same value. For example, in many instances, the timing of the clock signals and/or the data signals has drifted e.g., as a result of temperature changes, voltage changes, and/or noise. Such a drift may result in a misalignment between the data signal and the clock signals which may result in incorrect data sampling.

For example, FIG. 2B, illustrates example sampling times (advanced sampling time 202b, sampling time 204b, and delayed sampling time 206b) in relation to data eye 210. Advanced sampling time 202b may be according to an advanced clock signal, sampling time 204b may be according to a clock signal, and delayed sampling time 206b may be according to a delayed clock signal. In the example timing illustrated in FIG. 2B, there is a misalignment between data signal 208 and the clock signals (i.e., the clock signals upon which advanced sampling time 202b, sampling time 204b, and delayed sampling time 206b are based). Such a misalignment may be the result of the clock signals being advanced and/or the data signal being delayed. Sampling according to sampling time 204b or delayed sampling time 206b may result in a correct sample e.g., data sample 214b and delayed data sample 216b may be correct. In contrast, sampling according to advanced sampling time 202b may result in an incorrect result e.g., advanced data sample 212b may be incorrect.

As another example, FIG. 2C, illustrates example sampling times (advanced sampling time 202c, sampling time 204c, and delayed sampling time 206c) in relation to data eye 210. Advanced sampling time 202c may be according to an advanced clock signal, sampling time 204c may be according to a clock signal, and delayed sampling time 206c may be according to a delayed clock signal. In the example timing illustrated in FIG. 2C, there is a misalignment between data signal 208 and the clock signals (i.e., the clock signals upon which advanced sampling time 202c, sampling time 204c, and delayed sampling time 206c are based). Such a misalignment may be the result of the clock signals being delayed and/or the data signal being advanced. Sampling according to advanced sampling time 202c or sampling time 204c may result in a correct sample e.g., advanced data sample 212c and data sample 214c may be correct. In contrast, sampling according to delayed sampling time 206c may result in an incorrect result e.g., delayed data sample 216c may be incorrect.

In some embodiments, three clock signals may be obtained (e.g., an advanced clock signal, a clock signal, and a delayed clock signal). The data signal may be sampled according to each of the clock signals (e.g., to generate an advanced data sample, a data sample, and a delayed data sample). The data samples may be compared. A data sample matching the majority of data samples may be verified and/or output. Additionally or alternatively, one of clock signals may be selected for future data sampling. Additionally or alternatively, the clock signals and/or the data signal may be adjusted such that future data samples are correct and/or so that future data samples are sampled closer to a center of a data eye.

For example, in the example timing illustrated in FIG. 2A, data signal 208 may be sampled according to each of an advanced clock signal (e.g., at advanced sampling time 202a), a clock signal (e.g., at sampling time 204a), and a delayed clock signal (e.g., at delayed sampling time 206a). The resulting data samples, advanced data sample 212a, data sample 214a, and delayed data sample 216a, may be compared. Because the data signal has the same value at advanced sampling time 202a, sampling time 204a, and delayed sampling time 206a, advanced data sample 212a, data sample 214a, and delayed data sample 216a may be the same (i.e., have the same logical value). Thus, any of the data samples may be verified (and/or output). Additionally or alternatively, because all of the data samples were the same, the clock signal (i.e., the clock signal that gave rise to sampling time 204a), may be selected for future data sampling. Additionally or alternatively, because all of the data samples were the same, no adjustment to the relative timing of the clock signals and the data signal is made.

As another example, in the example timing illustrated in FIG. 2B, data signal 208 may be sampled according to each of an advanced clock signal (e.g., at advanced sampling time 202b), a clock signal (e.g., at sampling time 204b), and a delayed clock signal (e.g., at delayed sampling time 206b). The resulting data samples, advanced data sample 212b, data sample 214b, and delayed data sample 216b, may be compared. Because the data signal has the same value at sampling time 204b and delayed sampling time 206b, data sample 214b and delayed data sample 216b may be the same. Thus, data sample 214b and/or delayed data sample 216b may be verified (and/or output). Also, because the data signal at advanced sampling time 202b may be in transition, advanced data sample 212b may be different than data sample 214b and delayed data sample 216b. Accordingly, advanced data sample 212b may be dropped. Additionally or alternatively, advanced data sample 212b being different than data sample 214b and delayed data sample 216b may be an indication of the misalignment between the data signal and the at least the advanced clock signal. In some embodiments, based on advanced data sample 212b being different than data sample 214b and delayed data sample 216b, one of the clock signal (i.e., the clock signal that gave rise to sampling time 204b) or the delayed clock signal (i.e., the delayed clock signal that gave rise to delayed sampling time 206b) may be selected for future data sampling. In some embodiments, based on advanced data sample 212b being different than data sample 214b and delayed data sample 216b, one or more of the clock signals, (e.g., the advanced clock signal, the clock signal, and the delayed clock signal), may be delayed relative to the data signal such that future samples may be a result of a sampling with a tighter alignment.

As another example, in the example timing illustrated in FIG. 2C, data signal 208 may be sampled according to each of an advanced clock signal (e.g., at advanced sampling time 202c), a clock signal (e.g., at sampling time 204c), and a delayed clock signal (e.g., at delayed sampling time 206c). The resulting data samples, advanced data sample 212c, data sample 214c, and delayed data sample 216c, may be compared. Because the data signal has the same value at advanced sampling time 202c and sampling time 204c, advanced data sample 212c and data sample 214c may be the same. Thus, advanced data sample 212c and/or data sample 214c may be verified (and/or output). Also, because the data signal may be in transition at delayed sampling time 206c, delayed data sample 216c may be different than advanced data sample 212c and data sample 214c. Accordingly, delayed data sample 216c may be dropped. Additionally or alternatively, delayed data sample 216c being different than advanced data sample 212c and data sample 214c may be an indication of the misalignment between the data signal and at least the delayed clock signal. In some embodiments, based on delayed data sample 216c being different than advanced data sample 212c and data sample 214c, one of the advanced clock signal (i.e., the clock signal that gave rise to advanced sampling time 202c) or the clock signal (i.e., the clock signal that gave rise to sampling time 204c) may be selected for future data sampling. In some embodiments, based on delayed data sample 216c being different than advanced data sample 212c and data sample 214c, one or more of the clock signals (e.g., the advanced clock signal, the clock signal, and the delayed clock signal) may be advanced relative to the data signal such that future samples may be a result of a sampling with a tighter alignment.

Thus, in some embodiments, a majority of data samples may be used to determine a correct data sample and/or a clock signal to provide correct data samples. Additionally or alternatively, the majority of data samples may be used to determine an adjustment to clock signals (and/or data signals) to provide for more accurate future sampling.

While examples of the disclosure describe and illustrate three sampling times (e.g., according to a respective three clock signals) and three data samples, this is not limiting. Additional sampling times, clock signals, and data samples are contemplated.

Data signals, e.g., data signal 208, may be continuous, e.g., data signal 208 may include a data eye 210 including new data at regular intervals, e.g., every clock cycles of a circuit. Some embodiments may be configured to, at each sampling period e.g., according to the regular intervals of the data signal 208, select a correct data sample, determine a clock signal (e.g., determine a clock signal to use to sample the data signal during a subsequent sampling period), and/or adjust a clock signal (e.g., adjust a clock signal to be used to sample the data signal during subsequent sampling periods). Other embodiments may be configured to select a correct data sample, determine a clock signal, and/or adjust one or more clock signals less frequently than every sampling period. For example, some embodiments may be configured to select a correct data sample, determine a clock signal, and/or adjust one or more clock signals at regular intervals (e.g., after a number of sampling periods or clock cycles) or in response to predefined conditions.

Figure 3:
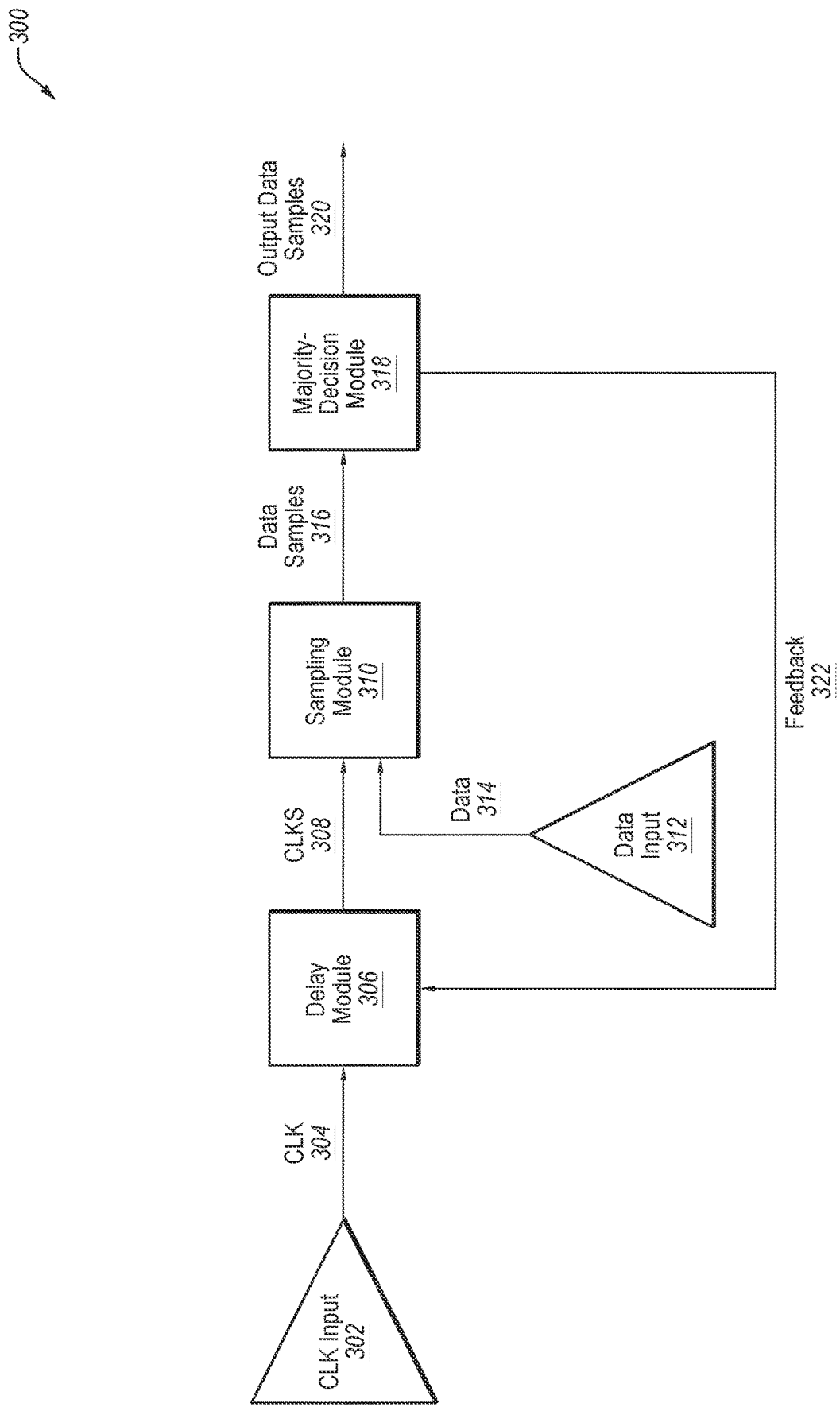
FIG. 3 is a functional block diagram illustrating an example timing circuit in accordance with at least one embodiment of the disclosure.

FIG. 3 is a functional block diagram illustrating an example timing circuit 300 in accordance with at least one embodiment of the disclosure. Timing circuit 300 may be configured to select and output a correct data sample, select a clock signal for data sampling (e.g., to obtain correct data samples in subsequent sampling periods), adjust one or more clock signals (e.g., such that subsequent data samples are correct), or combinations thereof. Timing circuit 300 includes a CLK input 302, a delay module 306, a sampling module 310, a data input 312, and a majority-decision module 318.

An incoming clock signal (e.g., incoming clock signal 304) may be received at CLK input 302. For example, ICLK or LCLK of FIG. 1 may be received at CLK input 302.

Incoming clock signal 304 may be variously delayed and/or advanced at delay module 306 to produce multiple clock signals 308. Delay module 306 may include one or more adjustment elements arranged in one or more paths. Each of the adjustment elements may be any suitable delay element e.g., one or more inverters. Additionally or alternatively, delay module may include one or more adjustment elements configured to advance a clock signal. Additionally or alternatively, delay module 306 may include several clock delay options which are selectable e.g., based on feedback 322. For example, if feedback 322 is to advance the incoming clock signal 304, less clock delay may be selected to advance one or more of the clock signals 308. If feedback 322 is to delay the incoming clock signal 304, more clock delay may be selected to delay one or more of the clock signals 308.

Data signal 314 may be received via data input 312. Data signal 314 may be, for example, a command signal (e.g., COM of FIG. 1), an address signal (e.g., ADD of FIG. 1), or an input signal (e.g., at DQ of FIG. 1).

Sampling module 310 may be configured to sample data signal 314 according to each of clock signals 308 to produce data samples 316. Sampling module 310 may include multiple latch circuits and/or a decoders (e.g., an address decoder 130 of FIG. 1, a command decoder 150 of FIG. 1, and/or a data latch circuit for data input). In some embodiments, timing circuit 300 may be configured to output data samples 316 as output data samples 320.

Majority-decision module 318 may be configured to receive data samples 316 from sampling module 310. In some embodiments, majority-decision module 318 may be configured to select one of data samples 316 and provide the selected one of data samples 316 as output data samples 320. The selected data sample may be selected because the selected data sample represents a correct data sample as such, output data samples 320 may be a verified data sample.

In some embodiments, majority-decision module 318 may be configured to provide feedback 322 to delay module 306. In some embodiments, delay module 306 may be configured to receive feedback 322. Delay module 306 may include one or more adjustable delay elements and may be configured to generate one or more clock signals 308 to provide to sampling module 310 (or to a particular input of sampling module 310) based on feedback 322. One of the clock signals 308 may be generated by delay module 306 based on feedback 322 to have a closer time alignment with data signal 314 than another of the clock signals 308. The selected clock signal may allow timing circuit 300 to obtain correct data samples in subsequent sampling periods. In these or other embodiments, data samples 316 resulting from one of the clock signals 308 may be output as output data samples 320 without selection by majority-decision module 318.

In some embodiments, delay module 306 may be configured to receive feedback 322 and to adjust one or more of clock signals 308 to provide to sampling module 310 based on feedback 322. Clock signals 308 may be adjusted to have closer time alignment with data signal 314. The adjusted clock signals may allow timing circuit 300 to obtain correct data samples in subsequent sampling periods. In these or other embodiments, data samples 316 resulting from one of the clock signals 308 may be output as output data samples 320 without selection by majority-decision module 318.

Figure 4:
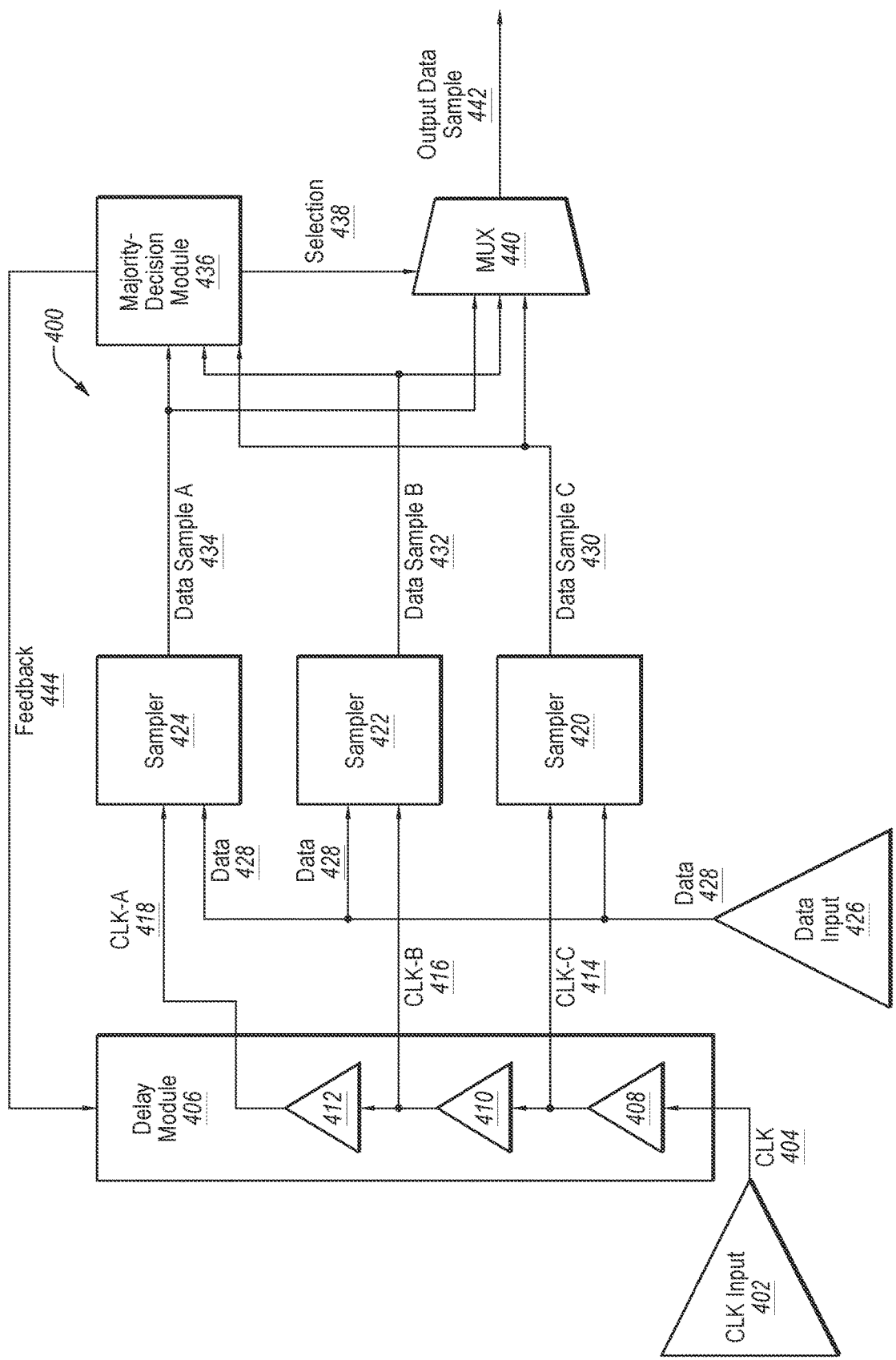
FIG. 4 is a functional block diagram illustrating another example timing circuit in accordance with at least one embodiment of the disclosure.

FIG. 4 is a functional block diagram illustrating another example timing circuit 400 in accordance with at least one embodiment of the disclosure. Timing circuit 400 may be configured to obtain three data samples and select and output a correct data sample. Timing circuit 400 may include a clk input 402, a delay module 406, a sampler 420, a sampler 422, a sampler 424, a data input 426, a majority-decision module 436, and a multiplexer 440 (also referred to herein as "mux 440").

An incoming clock signal (e.g., incoming clock signal 404) may be received via clk input 402. For example, ICLK or LCLK of FIG. 1 may be received via clk input 402.

Incoming clock signal 404 may be delayed at delay module 406 to produce an advanced clock signal 414, a clock signal 416, and a delayed clock signal 418. Delay module 406 may include one or more adjustment elements e.g., an adjustment element 408, an adjustment element 410, and an adjustment element 412. Each of the adjustment elements may be any suitable delay element e.g., one or more inverters. Additionally or alternatively, delay module 406 may be configured to adjust the delay in one or more of adjustment element 408, adjustment element 410, and/or adjustment element 412 based on the feedback 444 from majority-decision module 436 (e.g., similar to what was described above with regard to majority-decision module 318, feedback 322, and delay module 306).

Incoming clock signal 404 may be delayed (or advanced) by adjustment element 408 to produce advanced clock signal 414. Advanced clock signal 414 may be delayed by adjustment element 410 to produce clock signal 416. Clock signal 416 may be delayed by adjustment element 412 to produce delayed clock signal 418.

Data signal 428 may be received via data input 426. Data signal 428 may be, for example, a command signal (e.g., COM of FIG. 1), an address signal (e.g., ADD of FIG. 1), or an input signal (e.g., at DQ of FIG. 1).

Sampler 420 may be configured to sample data signal 428 according to advanced clock signal 414 to produce advanced data sample 430. Sampler 422 may be configured to sample data signal 428 according to clock signal 416 to produce data sample 432. Sampler 424 may be configured to sample data signal 428 according to delayed clock signal 418 to produce delayed data sample 434. Each of sampler 420, sampler 422, and sampler 424 may include a latch circuit and/or a decoder (e.g., an address decoder 130 of FIG. 1, a command decoder 150 of FIG. 1).

Majority-decision modules 436 may receive each of advanced data sample 430 from sampler 420, data sample 432 from sampler 422, and delayed data sample 434 from sampler 424. Further, majority-decision module 436 may be configured to determine which of advanced data sample 430, data sample 432, and delayed data sample 434 is correct. More specifically, majority-decision module 436 may be configured to compare advanced data sample 430, data sample 432, and delayed data sample 434. Based on the comparison, majority-decision module 436 may be configured to output a selection signal 438 indicative of a correct data sample. Mux 440 may be configured to receive the selection signal 438 and to provide output data sample 442 based on selection signal 438.

In some embodiments, majority-decision module 436 may be configured to compare advanced data sample 430 to data sample 432 and delayed data sample 434 to data sample 432 e.g., using two XOR gates. For example, majority-decision module 436 may compare advanced data sample 430 to data sample 432 at a first XOR gate and data sample 432 to delayed data sample 434 at a second XOR gate. If the first XOR gate outputs a '1' and the second XOR gate outputs a '0,' majority-decision module 436 may be configured to provide selection signal 438 indicating that data sample 432 or delayed data sample 434 is a correct data sample. Alternatively, if the first XOR gate outputs a '0' and the second XOR gate outputs a '1,' majority-decision module 436 may be configured to provide selection signal 438 indicating that advanced data sample 430 or data sample 432 is a correct data sample. Alternatively, if the first XOR gate outputs a '0' and the second XOR gate outputs a '0,' majority-decision module 436 may be configured to provide selection signal 438 indicating that any of advanced data sample 430, data sample 432, or delayed data sample 434 is a correct data sample. Alternatively, if the first XOR gate outputs a '1' and the second XOR gate outputs a '1,' majority-decision module 436 may be configured to provide selection signal 438 indicating that data sample 432 is a correct data sample.

In some embodiments, in addition to selecting a data sample for outputting, majority-decision module 436 may be configured to provide feedback 444 to delay module 406. Delay module 406 may be configured to adjust a timing of one or more of advanced clock signal 414, clock signal 416, and delayed clock signal 418 based on feedback 444 e.g., such one or more of advanced clock signal 414, clock signal 416, and delayed clock signal 418 is more closely aligned with data signal 428 for future data sampling.

In some embodiments, timing circuit 400 may be configured to compare data samples and determine a correct data sample every sampling period. In other embodiments, timing circuit 400 may be configured to compare data samples and determine a correct data sample less frequently than at every sampling period. For example, timing circuit 400 may be configured to compare data samples and determine a correct data sample every other, or every third, sampling period. In the sampling period in which timing circuit 400 does not compare data samples, timing circuit 400 may be configured to output a data sample from the sampler (i.e., according to clock signal) that provided the data sample most recently determined to be correct. In this way, the timing circuit 400 may be configured to select a clock signal for subsequent data sampling.

Figure 5:
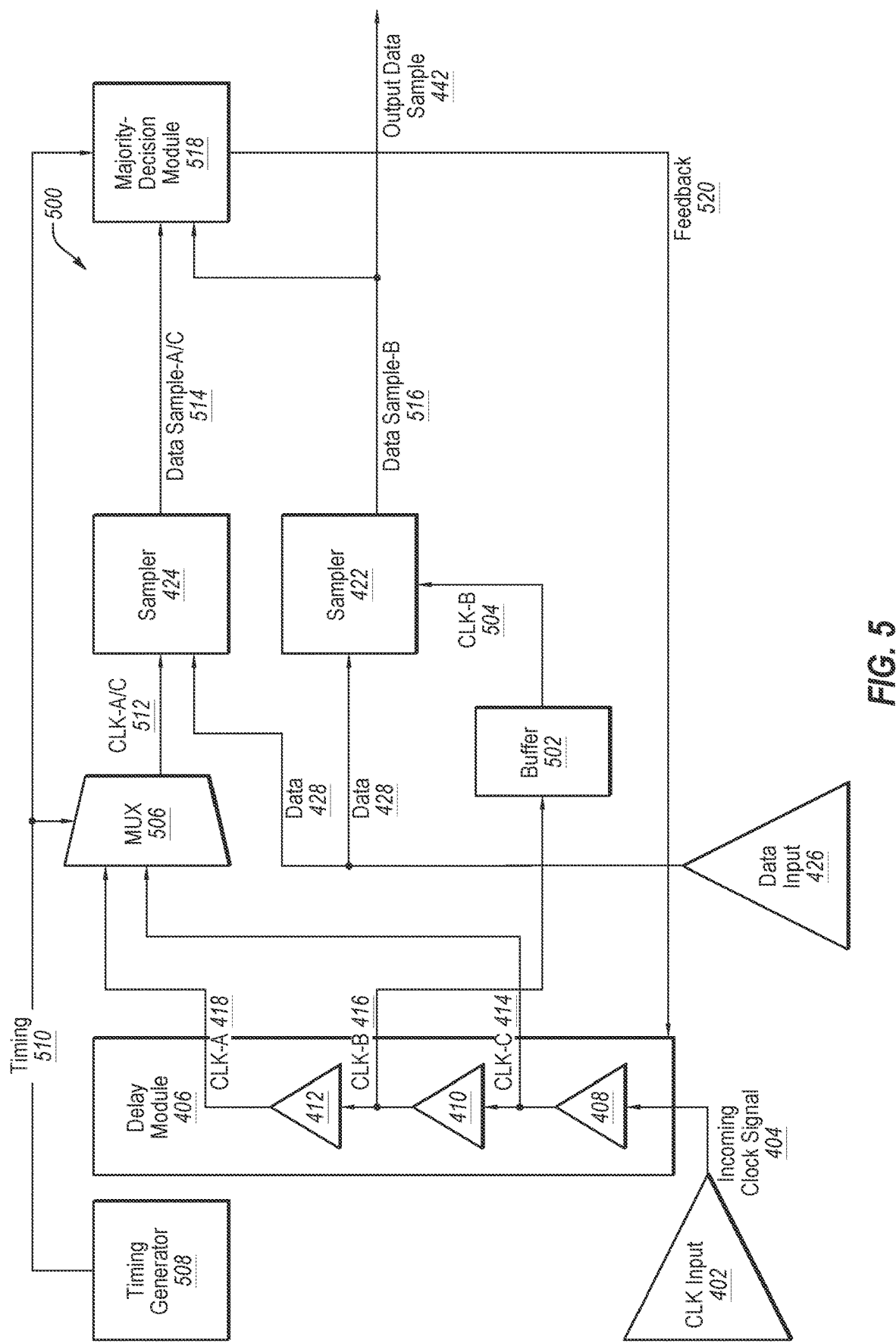
FIG. 5 is a functional block diagram illustrating another example timing circuit in accordance with at least one embodiment of the disclosure.

FIG. 5 is a functional block diagram illustrating another example timing circuit 500 in accordance with at least one embodiment of the disclosure. Timing circuit 500 may be configured to obtain three clock signals and to adjust one of the three clock signals for data sampling e.g., to obtain correct data samples in subsequent sampling periods.

Timing circuit 500 may include many elements that are the same as, or substantially similar to their respective counterparts in timing circuit 400 of FIG. 4. In particular, timing circuit 500 may include clk input 402, delay module 406 (including adjustment element 408, adjustment element 410, and adjustment element 412), sampler 422, sampler 424, and data input 426. Additionally, timing circuit 500 may include a timing generator 508, majority-decision module 518, and one or more multiplexers, in particular, buffer 502 and mux 506.

Timing circuit 500 may receive incoming clock signal 404 via clk input 402 and provide incoming clock signal 404 to delay module 406. Delay module 406 may produce advanced clock signal 414, clock signal 416, and delayed clock signal 418 based on incoming clock signal 404.

In some embodiments, clock signal 416 may be provided to buffer 502 (e.g., by delay module 406). After clock signal 416 passes through buffer 502, Clk-B 504 may be provided to sampler 422. Buffer 502 may delay Clk-B 416 by the same duration of time that MUX 506 delays Clk-C 414 and Clk-A 418. In other words, the propagation delay time caused by MUX 506 is matched by a propagation delay cause by buffer 502 so the timing difference between Clk-C 414 and Clk-B 416 is similar to the timing difference between Clk-A/C 512 and Clk-B 504. Similarly the timing difference between Clk-A 418 and CLK-B 416 is similar to the timing difference between Clk-A/C 512 and Clk-B 504. Alternatively, in some embodiments, buffer 502 may be omitted and clock signal 416 may be provided directly to sampler 422.

Sampler 422 may be configured to sample data signal 428 according to Clk-B 504 to produce data sample-B 516. Data sample-B 516 may be a data sample sampled from data signal 428 according to Clk-B 504.

Data sample-B 516 may be provided to majority-decision module 518. Additionally, data sample-B 516 may be output as output data sample 442.

Advanced clock signal 414 and delayed clock signal 418 may be provide to mux 506. Mux 506 may provide Clk-A/C 512 to sampler 424. Clk-A/C 512 may be one of advanced clock signal 414 and delayed clock signal 418. Mux 506 may be configured to select Clk-A/C 512 according to a timing signal 510 from timing generator 508.

Timing generator 508 and mux 506 may be configured to provide advanced clock signal 414 at a first time and to provide delayed clock signal 418 at a second time such that sampler 424 samples data signal 428 according to advanced clock signal 414 at the first time and samples data signal 428 according to delayed clock signal 418 at the second time.

In some embodiments, the first and the second times may both be within a single sampling period e.g., within a time period corresponding to a data eye of the data signal 428. For example, timing generator 508 and mux 506 may be configured to provide advanced clock signal 414 and delayed clock signal 418 to sampler 424 at a timing, relative to data signal 428, that is analogous to the timing of advanced sampling times 202 and delayed sampling times 206 relative to data eye 210 (see FIGS. 2A-2C). In other embodiments, the first time may be during a first sampling period and/or data eye and the second time may be during a second sampling period and/or data eye.

Sampler 424 may be configured to sample data signal 428 according to Clk-A/C 512 to produce data sample-A/C 514. Data sample-A/C 514 may be a data sample sampled from data signal 428 according to the selected one of advanced clock signal 414 and delayed clock signal 418. Thus, data sample-A/C 514 may include a first data sample at the first time and a second data sample at a second time. Data sample-A/C 514 may be provided to majority-decision module 518.

Majority-decision module 518 may function as described above with regard to majority-decision module 436 of FIG. 4 and/or majority-decision module 318 of FIG. 3, additionally or alternatively, because data sample-A/C 514 includes two data samples (i.e., one at the first time and one at the second time), majority-decision module 518 may be configured to operate in time with the first time and the second time. To this end, majority-decision module 518 may receive timing signal 510 from timing generator 508.

Majority-decision module 518 may be configured to compare data sample-A/C 514 and data sample-B 516. Based on the comparison, majority-decision module 518 may be configured to determine which of the data samples of data sample-A/C 514 (i.e., the data sample of the first time or the data sample of the second time) matches data sample-B 516. Based on which of the data samples of data sample-A/C 514 matches data sample-B 516, majority-decision module 518 may be configured to provide feedback 520 to delay module 406. Feedback 520 may be indicative of an adjustment to be made to one or more of advanced clock signal 414, clock signal 416, and delayed clock signal 418. Delay module 406 may be configured to adjust one or more of advanced clock signal 414, clock signal 416, and delayed clock signal 418 such that the adjusted one or more of advanced clock signal 414, clock signal 416, and delayed clock signal 418 is more closely aligned with data signal 428 and future sampling is more accurate.

For example, in a first case, where data sample-B 516 matches a first data sample of data sample-A/C 514 (i.e., a data sample resulting from sampling data signal 428 according to advanced clock signal 414) and where data sample-B 516 does not match a second data sample of data sample-A/C 514 (i.e., a data sample resulting from sampling data signal 428 according to delayed clock signal 418), majority-decision module 518 may be configured to generate feedback 520 indicative that one or more of advanced clock signal 414, clock signal 416, and delayed clock signal 418 should be advanced. In response, delay module 406 may be configured to advance one or more of one or more of advanced clock signal 414, clock signal 416, and delayed clock signal 418 for future data sampling by decreasing an amount of delay applied. As another example, in a second case, where data sample-B 516 matches a second data sample of data sample-A/C 514 (i.e., a data sample resulting from sampling data signal 428 according to delayed clock signal 418) and where data sample-B 516 does not match a first data sample of data sample-A/C 514 (i.e., a data sample resulting from sampling data signal 428 according to advanced clock signal 414), majority-decision module 518 may be configured to generate feedback 520 indicative that one or more of advanced clock signal 414, clock signal 416, and delayed clock signal 418 should be delayed. In response, delay module 406 may be configured to delay one or more of one or more of advanced clock signal 414, clock signal 416, and delayed clock signal 418 for future data sampling by increasing an amount of delay applied.

In embodiments in which timing generator 508, mux 506, and sampler 424 are configured to provide an advanced data sample in a first sampling period and a delayed data sample in a second sampling period, in sampling periods in which one of the advanced data sample and the delayed data sample is not provided, majority-decision module 518 may be configured to treat the absent data sample as if it were the same as data sample-B 516. In other words, majority-decision module 518 may be configured to provide feedback 520 to delay module 406 indicative of an advance or a delay based on a difference between data sample-B 516 and data sample-A/C 514 but not based on a similarity between data sample-B 516 and data sample-A/C 514.

Because timing circuit 500 provides Clk-A/C 512 to sampler 424, which samples data signal 428 according to Clk-A/C 512, timing circuit 500 may not require a sampler for each of advanced clock signal 414 and delayed clock signal 418. For example, compared with timing circuit 400, timing circuit 500 omits sampler 420. This results in a saving of space and/or power in timing circuit 500 compared with timing circuit 400.

In some embodiments, timing circuit 500 may be configured to compare data samples and select a clock signal every sampling period. The selected clock signal may be used to obtain a subsequent data sample. In other embodiments, timing circuit 500 may be configured to compare data samples and adjust a clock signal less frequently than at every sampling period. For example, timing circuit 500 may be configured to compare data samples and adjust a clock signal every other, or every third, sampling period. In the sampling periods in which timing circuit 500 does not compare data samples, timing circuit 500 may be configured to not provide feedback 520 and delay module 406 may be configured to continue providing signals based on a previously-selected delay setting.

Figure 6:
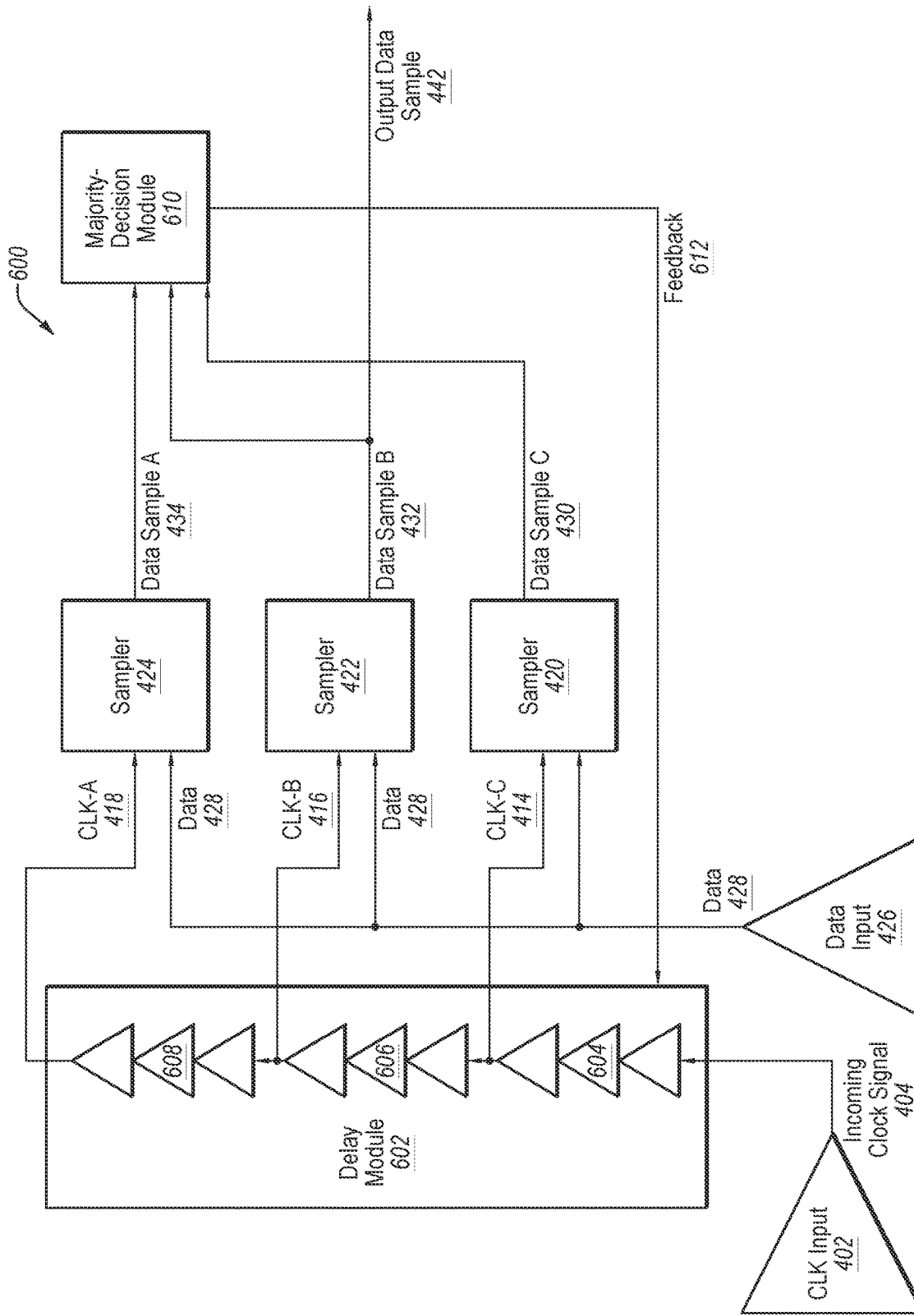
FIG. 6 is a functional block diagram illustrating yet another timing circuit in accordance with at least one embodiment of the disclosure.

FIG. 6 is a functional block diagram illustrating yet another timing circuit 600 in accordance with at least one embodiment of the disclosure. Timing circuit 600 may be configured to compare three data samples and adjust one or more clock signals based on the comparison.

Timing circuit 600 may include many elements that are the same as, or substantially similar to their respective counterparts in timing circuit 400 of FIG. 4. In particular, timing circuit 600 may include clk input 402, sampler 420, sampler 422, sampler 424, and data input 426. Additionally, timing circuit 600 may include a majority-decision module 610 and a delay module 602 including delay element 604, delay element 606, and delay element 608.

Timing circuit 600 may receive incoming clock signal 404 via clk input 402 and provide incoming clock signal 404 to delay module 406. Delay module 406 may produce advanced clock signal 414, clock signal 416, and delayed clock signal 418 based on incoming clock signal 404. In particular, incoming clock signal 404 may be delayed by delay module 602 to produce advanced clock signal 414. Advanced clock signal 414 may be delayed by delay element 606 to produce clock signal 416. Clock signal 416 may be delayed by delay element 608 to produce delayed clock signal 418.

Sampler 420 may be configured to sample data signal 428 according to advanced clock signal 414 to produce advanced data sample 430. Sampler 422 may be configured to sample data signal 428 according to clock signal 416 to produce data sample 432. Sampler 424 may be configured to sample data signal 428 according to delayed clock signal 418 to produce delayed data sample 434. Sampler 420 may be configured to provide advanced data sample 430 to majority-decision module 610, sampler 422 may be configured to provide data sample 432 to majority-decision module 610, and sampler 424 may be configured to provide delayed data sample 434 to majority-decision module 610. Additionally, sampler 422 may be configured to provide data sample 432 as output data sample 442.

Majority-decision module 610 may function as described above with regard to majority-decision module 318 of FIG. 3, majority-decision module 436 of FIG. 4, and/or majority-decision module 518, for example, majority-decision module 610 may provide feedback 612 to delay module 602. Delay module 602 may be configured to adjust a timing of one or more of the clock signals based on feedback 612.

For example, delay module 602 may include one or more adjustable delay elements. In particular, one or more of delay element 604, delay element 606, and delay element 608, may be adjustable. For example, each of delay element 604, delay element 606, and delay element 608 may include two or more delay paths including different numbers of delay elements. As another example, each of delay element 604, delay element 606, and delay element 608 may be, or may include, a delay chain with multiple tap points. Delay module 602 may be configured to select delays of delay element 604, delay element 606, and/or delay element 608 according to feedback 612.

For example, delay element 604 may be a delay chain with multiple tap points. The tap point used may be based on feedback 612. Because all of advanced clock signal 414, clock signal 416, and delayed clock signal 418 are delayed by delay element 604, selection of a tap point at delay element 604 may delay or advance all of advanced clock signal 414, clock signal 416, and delayed clock signal 418.

Delay element 604, delay element 606, and delay element 608 may be adjustable by a fraction of a time separation between the clock signals. For example, referring to FIG. 2B, by increasing a delay at delay element 604, advanced clock signal 414 (which, for the purposes of this example may relate to advanced sampling time 202b) clock signal 416, (which, for the purposes of this example may relate to sampling time 204b), and delayed clock signal 418 (which, for the purposes of this example may relate to delayed sampling time 206b) may be delayed by, for example, half, or a third, of the distance between advanced sampling time 202b and sampling time 204b.

In some embodiments, timing circuit 600 may be configured to compare data samples and adjust one or more of the clock signals every sampling period. The adjusted clock signal may be used to obtain subsequent data samples. In other embodiments, timing circuit 600 may be configured to adjust one or more of the clock signals less frequently than at every sampling period. For example, timing circuit 600 may be configured to employ hysteresis when determining whether to adjust the one or more clock signals. For example, timing circuit 600 may be configured to compare the data samples at each sampling period, but, to only adjust the clock signals in response to certain conditions being satisfied. The certain conditions may include a number of samples matching and/or not matching.

For example, each time data sample 432 matches advanced data sample 430 and does not match delayed data sample 434 a counter may be decremented. And, each time data sample 432 matches sampler 424 and does not match advanced data sample 430, the counter may be incremented. Further, the one or more clock signals may be advanced in response to the counter exceeding a lower threshold and the one or more clock signals may be advanced in response to the counter exceeding an upper threshold.

As an example, table 1 is provided here illustrating the results of 12 example command-timing cycles:

| Timing | T1 | T2 | T3 | T4 | T5 | T6 | T7 | T8 | T9 | T10 | T11 | T12 |
|---|---|---|---|---|---|---|---|---|---|---|---|---|
| Advanced Data Sample | L | H | L | H | H | H | L | L | H | L | L | L |
| Data Sample | L | L | L | L | L | L | L | L | L | L | L | L |
| Delayed Data Sample | H | L | H | L | L | L | L | H | L | H | L | H |
| Counter | −1 | 0 | −1 | 0 | +1 | +2 | 0 | −1 | 0 | −1 | −1 | −2 |
| Majority Decision Output | | | | | | +1 | | | | | | −1 |

As can be seen in table 1, when the output of sampling B (e.g., data sample 432) matches the output of sampling C (e.g., advanced data sample 430) and does not match the output of sampling A (e.g., delayed data sample 434), the counter is decremented. For example, see timings T1 and T3. And, when the output of sampling B matches the output of sampling A and does not match the output of sampling C, the counter is incremented. For example, see timings T2 and T4. As further can be seen in table 1, when the counter reaches "+2" the delay is adjusted by increasing the delay. For example, see timing T6 in which the majority decision output is "+1" indicating an increase in the delay. And, when the counter reaches "−2" the delay counter is adjusted by advancing (or decreasing the delay). For example, see timing T12 in which the majority decision output is "−1" indicating a decrease in the delay.

FIG. 3 illustrates an example timing circuit 300 which may be configured to select a data sample, select a clock signal e.g., for subsequent data sampling, and/or adjust a clock signal e.g., for subsequent data sampling. FIG. 4 illustrates an example timing circuit 400 which may be configured to select a data sample, select a clock signal e.g., for subsequent data sampling, and/or adjust a clock signal e.g., for subsequent data sampling. FIG. 5 illustrates an example timing circuit 500 which may be configured to adjust a clock signal, e.g., for subsequent data sampling. And, FIG. 6 illustrates an example timing circuit 600 which may be configured to adjust one or more clock signals e.g., for subsequent data sampling. It is contemplated that a single timing circuit may include elements of each of timing circuit 300, timing circuit 400, timing circuit 500 and/or timing circuit 600 and may be configured to perform one or more of: selecting a data sample, selecting a clock signal, and/or adjusting a clock signal.

Figure 7:
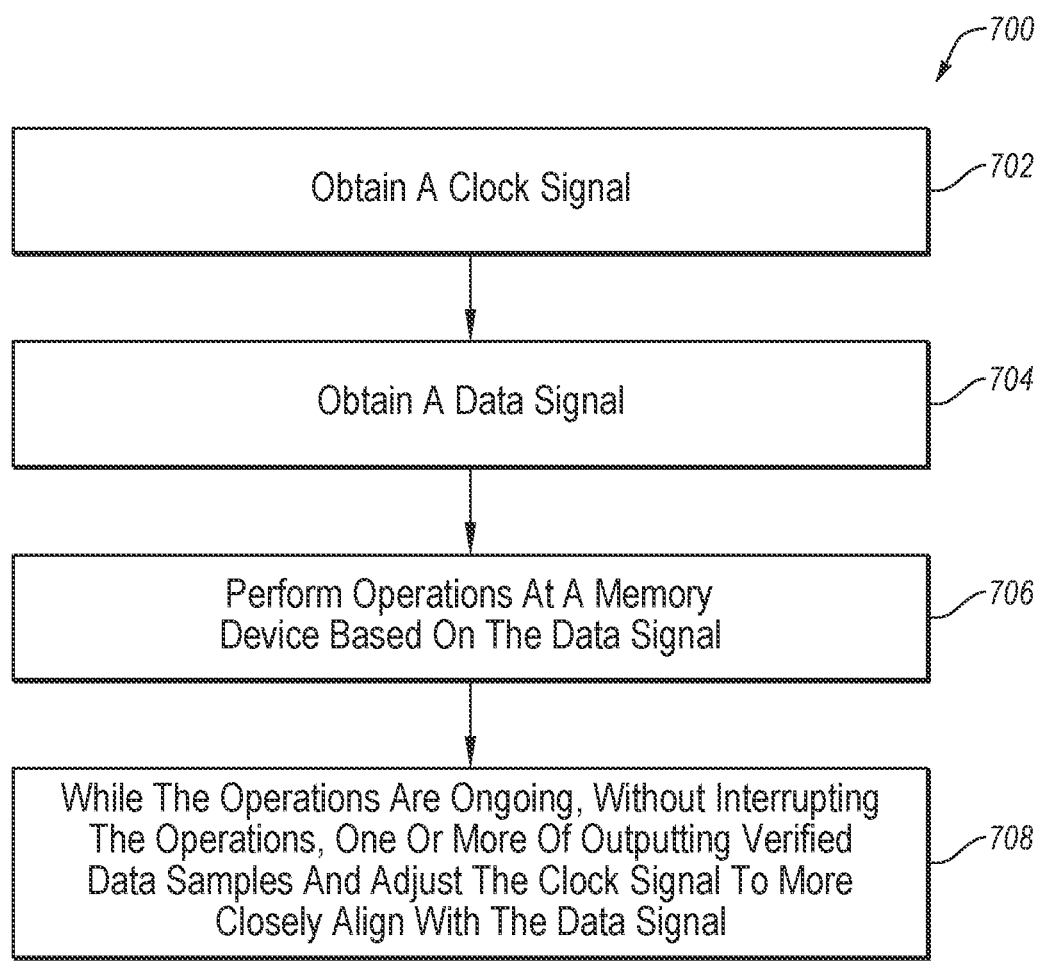
FIG. 7 is a flowchart illustrating an example method in accordance with at least one embodiment of the disclosure.

FIG. 7 is a flowchart illustrating an example method 700 in accordance with at least one embodiment of the disclosure. Method 700 may be arranged in accordance with at least one embodiment described in the disclosure. Method 700 may be performed, in some embodiments, by a device or system, such as memory device 100 of FIG. 1, timing circuit 300 of FIG. 3, timing circuit 400 of FIG. 4, timing circuit 500 of FIG. 5, timing circuit 600 of FIG. 6, memory system 900 of FIG. 9, electronic system 1000 of FIG. 10, or another device or system. Although illustrated as discrete blocks, various blocks may be divided into additional blocks, combined into fewer blocks, or eliminated, depending on the desired implementation.

At block 702, a clock signal may be obtained. The ICLK and/or LCLK of FIG. 1, and incoming clock signal 404 of FIG. 4, FIG. 5, and FIG. 6 are examples of the clock signal of block 702.

At block 704, a data signal may be obtained. The data signal of block 704 may be a command signal (e.g., COM of FIG. 1), an address signal (e.g., ADD of FIG. 1), or an input signal (e.g., at DQ of FIG. 1). Data signal 428 of FIG. 4, FIG. 5, and FIG. 6 are examples of the data signal of block 704.

At block 706, operations may be performed at a memory device based on the data signal. For example, the data signal may be indicative of a read or write command and the operation may include reading or writing data. As another example, the data signal may include an address to which data is to be read from or written to and the operations may include reading date from the address or writing data to the address. As another example, the data signal may be data to be written and the operations may include writing the data. As another example, the data signal may be data read from one or more memory cells of the memory device (e.g., a DRAM device) and the operations may include providing the read data at an output.

At block 708, while the operations are ongoing, and without interrupting the operations, one or more of the following may occur: verified data samples may be output and the clock signal may be adjusted to align the clock signal with the data signal.

Outputting verified data samples may include selecting a data sample (e.g., a correct data sample) to output. Selecting the data sample may be verifying the data sample. An example of selecting data samples as outputting verified data samples is described with regard to timing circuit 400 of FIG. 4.

Additionally or alternatively, outputting verified data samples may include selecting a clock signal to use to sample the data signal. The selected clock signal may be used to sample the data signal to provide data samples. The selection of the clock signal may be verifying the clock signal and/or verifying data samples obtained using the selected clock signal. An example of selecting a clock signal as outputting verified data samples is described with regard to timing circuit 500 of FIG. 5.

An example of adjusting the clock signal to align the clock signal with the data signal is described with regard to timing circuit 600 of FIG. 6.

Modifications, additions, or omissions may be made to method 700 without departing from the scope of the disclosure. For example, the operations of method 700 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

Figure 8:
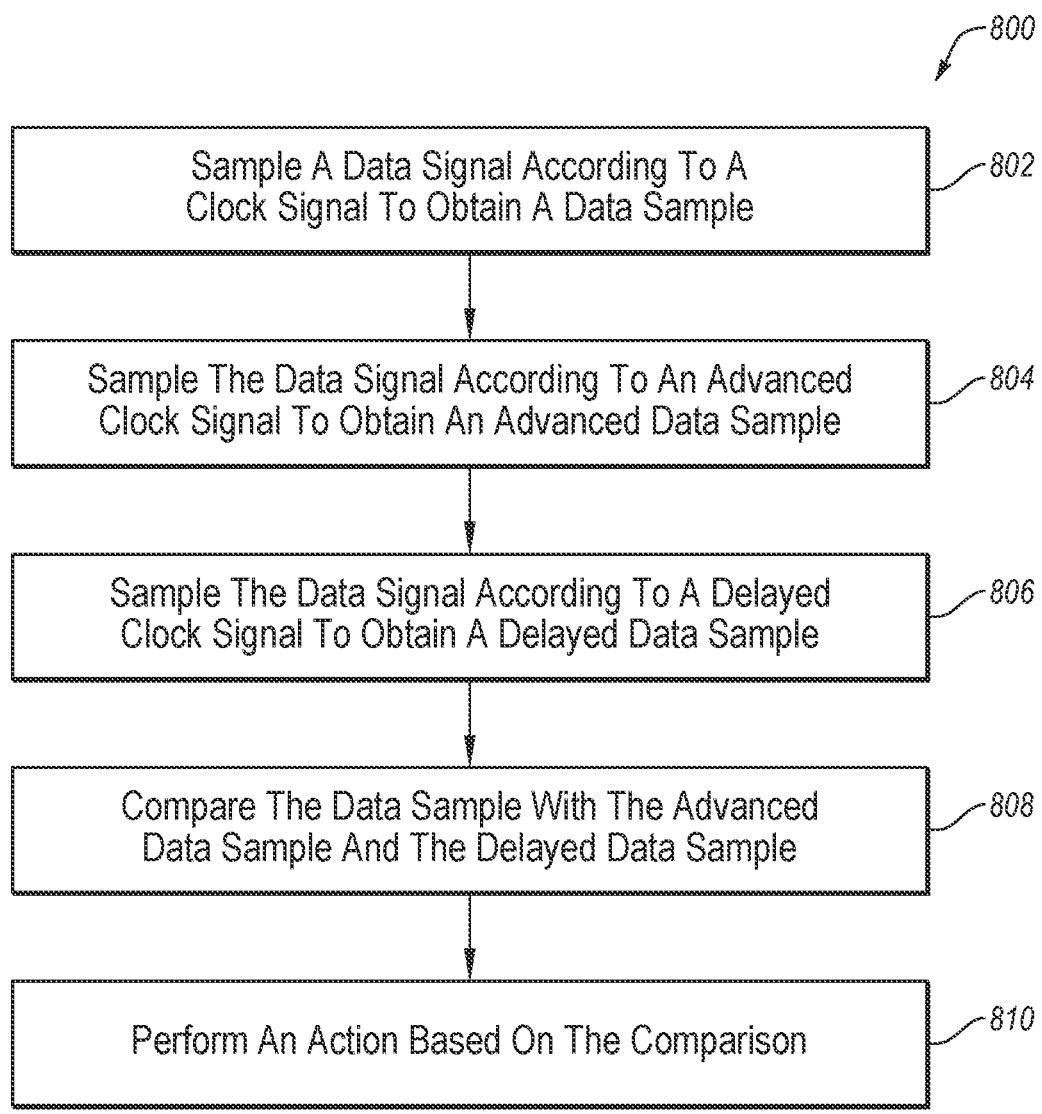
FIG. 8 is a flowchart illustrating another example method in accordance with at least one embodiment of the disclosure.

FIG. 8 is a flowchart illustrating another example method 800 in accordance with at least one embodiment of the disclosure. Method 800 may be arranged in accordance with at least one embodiment described in the disclosure. Method 800 may be performed, in some embodiments, by a device or system, such as memory device 100 of FIG. 1, timing circuit 300 of FIG. 3, timing circuit 400 of FIG. 4, timing circuit 500 of FIG. 5, timing circuit 600 of FIG. 6, memory system 900 of FIG. 9, electronic system 1000 of FIG. 10, or another device or system. Although illustrated as discrete blocks, various blocks may be divided into additional blocks, combined into fewer blocks, or eliminated, depending on the desired implementation.

At block 802, a data signal may be sampled according to a clock signal to obtain a data sample. Data sample 432 of FIG. 4 and FIG. 6, which is obtained by sampling data signal 428 according to clock signal 416 is an example of the data sample of block 802. Data sample-B 516 of FIG. 5, which is obtained by sampling data signal 428 according to Clk-B 504 is another example of the data sample of block 802.

At block 804, a data signal may be sampled according to an advanced clock signal to obtain an advanced data sample. Advanced data sample 430 of FIG. 4 and FIG. 6, which is obtained by sampling data signal 428 according to advanced clock signal 414 is an example of the advanced data sample of block 804. Data sample-A/C 514 of FIG. 5 (which includes an advanced data sample at a first time), which is obtained by sampling data signal 428 according to Clk-A/C 512 (which includes an advanced clock signal at the first time) is another example of the data sample of block 804.

At block 806, a data signal may be sampled according to a delayed data sample to obtain a delayed data sample. Delayed data sample 434 of FIG. 4 and FIG. 6, which is obtained by sampling data signal 428 according to delayed clock signal 418 is an example of the delayed data sample of block 806. Data sample-A/C 514 of FIG. 5 (which includes a delayed data sample at a second time), which is obtained by sampling data signal 428 according to Clk-A/C 512 (which includes a delayed clock signal at the second time) is another example of the data sample of block 806.

At block 808, the data sample may be compared with the advanced data sample and the delayed data sample. In some embodiments, the data sample may be compared with the advanced data sample in a first comparison and the data sample may be compared with the delayed data sample in a second comparison.

At block 810, an action may be performed based on the comparison or based on results of the comparison. The action of block 810 may include one or more of selecting a data sample, selecting a clock signal, and adjusting one or more clock signals.

For example, in some embodiments, the action may include outputting the advanced data sample or the data sample in response to the data sample matching the advanced data sample and the data sample not matching the delayed data sample; outputting the data sample in response to the data sample matching the advanced data sample and the data sample matching the delayed data sample; and outputting the delayed data sample or the data sample in response to the data sample not matching the advanced data sample and the data sample matching the delayed data sample.

As another example, in some embodiments, the action may include determining to output one or more subsequent advanced data samples obtained by sampling the data signal according to the advanced clock signal or one or more subsequent data samples obtained by sampling the data signal according to the clock signal in response to the data sample matching the advanced data sample and the data sample not matching the delayed data sample; determining to output the one or more subsequent data samples in response to the data sample matching the advanced data sample and the data sample matching the delayed data sample; and determining to output one or more subsequent delayed data samples obtained by sampling the data signal according to the delayed clock signal or the one or more subsequent data samples in response to the data sample not matching the advanced data sample and the data sample matching the delayed data sample.

As another example, in some embodiments, the action may include adjusting a delay for one or more of the advanced clock signal, the clock signal, and the delayed clock signal based on the comparison. Specifically, the action may include advancing one or more of the advanced clock signal, the clock signal, and the delayed clock signal in response to the data sample matching the advanced data sample and the data sample not matching the delayed data sample; or delaying one or more of the advanced clock signal, the clock signal, and the delayed clock signal in response to the data sample not matching the advanced data sample and the data sample matching the delayed data sample.

As another example, in some embodiments, the action may include incrementing or decrementing a counter in response to the comparison and wherein the method further comprises adjusting a delay for one or more of the advanced clock signal, the clock signal, and the delayed clock signal based on the comparison and in response to the counter exceeding a threshold. Specifically, the action may include decrementing a counter when the data sample matches the advanced data sample and the data sample does not match the delayed data sample; incrementing the counter when the data sample does not match the advanced data sample and the data sample matches the delayed data sample, advancing one or more of the advanced clock signal, the clock signal, and the delayed clock signal in response to the counter exceeding a lower threshold; and delaying one or more of the advanced clock signal, the clock signal, and the delayed clock signal in response to the counter exceeding a upper threshold.

Modifications, additions, or omissions may be made to method 800 without departing from the scope of the disclosure. For example, the operations of method 800 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

Figure 9:
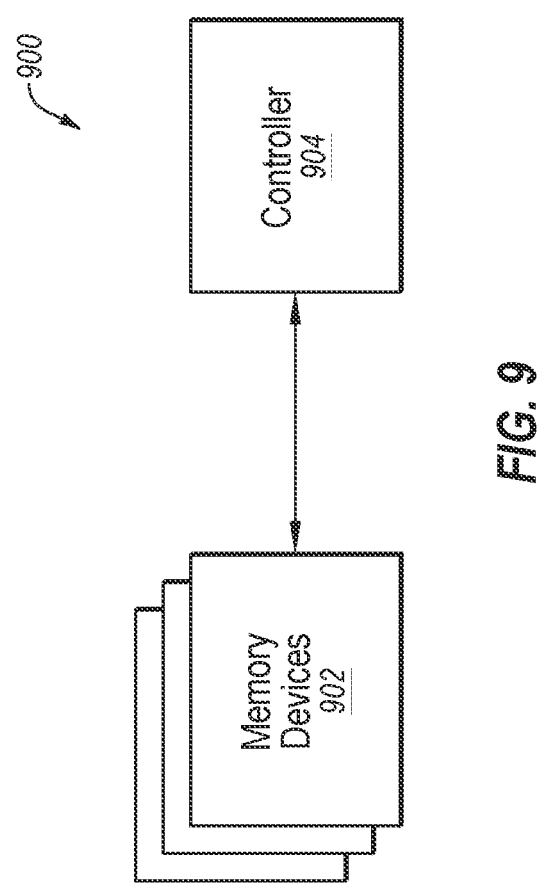
FIG. 9 is a simplified block diagram illustrating an example memory system, in accordance with at least one embodiment of the disclosure.

FIG. 9 is a simplified block diagram illustrating an example memory system 900, in accordance with at least one embodiment of the disclosure. Memory system 900, which may include, for example, a semiconductor device, includes a number of a memory devices 902 and a controller 904. Controller 904 may be operatively coupled with memory devices 902 so as to convey command/address signals (e.g., command/address signals received by command terminals 112 and/or address terminals 110 of FIG. 1) to memory devices 902.

Memory devices 902 may include memory device 100 e.g., including one or more timing circuits in accordance with at least one embodiment of the disclosure. For example, memory devices 902 may include one or more of timing circuit 300 of FIG. 3, timing circuit 400 of FIG. 4, timing circuit 500 of FIG. 5, and/or timing circuit 600 of FIG. 6. Additionally or alternatively, the memory system 900 may be configured to implement one or more of method 700 of FIG. 7 and/or method 800 FIG. 8 described in the disclosure.

An electronic system is also disclosed. According to various embodiments, the electronic system may include a memory device including a number of memory dies, each memory die having an array of memory cells. Each memory cell may include an access transistor and a storage element operably coupled with the access transistor.

Figure 10:
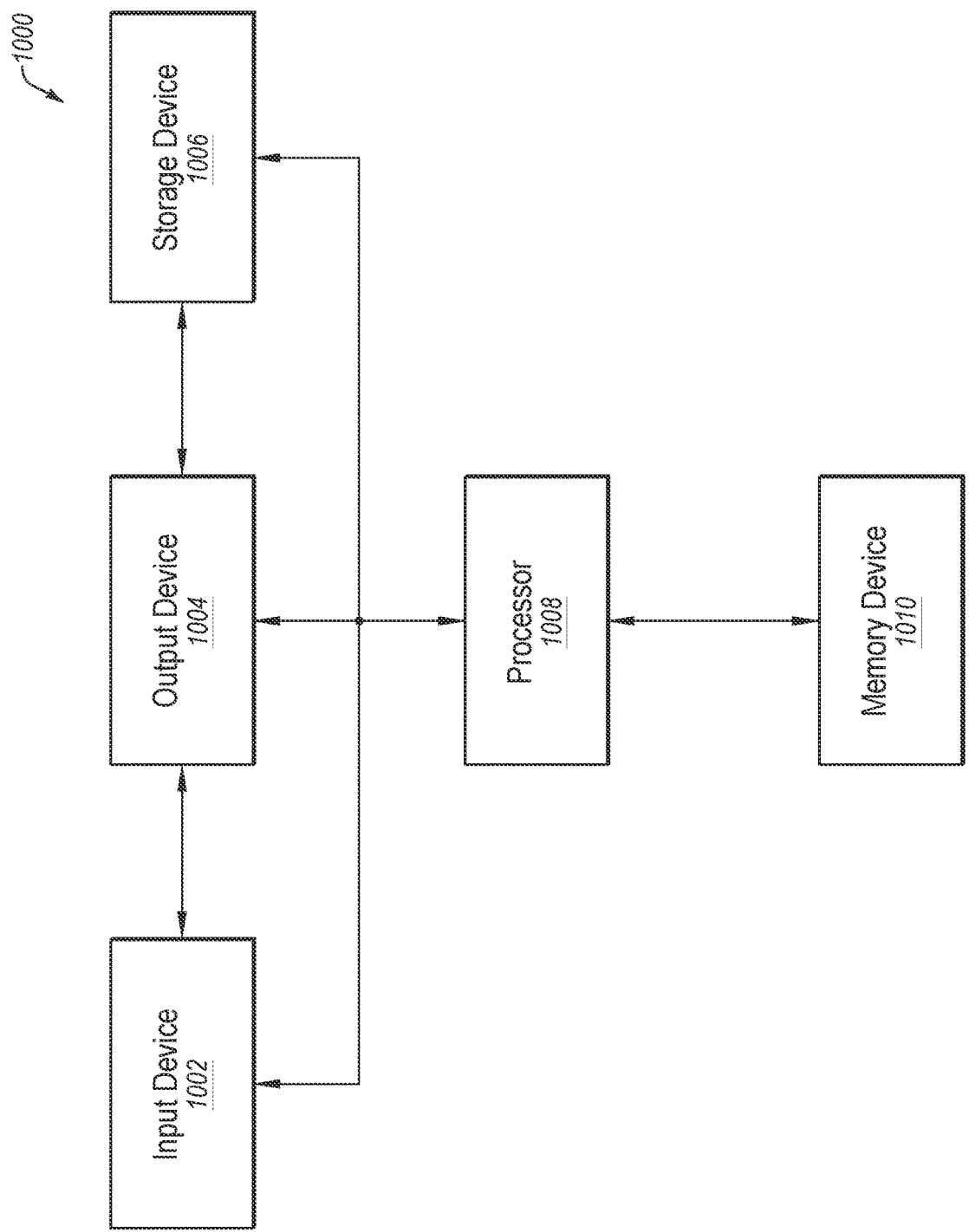
FIG. 10 is a simplified block diagram illustrating an example electronic system, in accordance with at least one embodiment of the disclosure.

FIG. 10 is a simplified block diagram illustrating an example electronic system, in accordance with at least one embodiment of the disclosure. Electronic system 1000 includes at least one input device 1002, which may include, for example, a keyboard, a mouse, or a touch screen. Electronic system 1000 further includes at least one output device 1004, such as a monitor, a touch screen, or a speaker. Input device 1002 and output device 1004 are not necessarily separable from one another. Electronic system 1000 further includes a storage device 1006. Input device 1002, output device 1004, and storage device 1006 may be coupled to a processor 1008. Electronic system 1000 further includes a memory device 1010 coupled to processor 1008. Memory device 1010 may include at least a portion of memory system 900 of FIG. 9. Electronic system 1000 may include, for example, a computing, processing, industrial, or consumer product. For example, without limitation, electronic system 1000 may include a personal computer or computer hardware component, a server or other networking hardware component, a database engine, an intrusion prevention system, a handheld device, a tablet computer, an electronic notebook, a camera, a phone, a music player, a wireless device, a display, a chip set, a game, a vehicle, or other known systems.

Various embodiments may include a method. The method may include sampling a data signal according to a clock signal to obtain a data sample. The method may also include sampling the data signal according to an advanced clock signal to obtain an advanced data sample. The method may also include sampling the data signal according to a delayed clock signal to obtain a delayed data sample; comparing the data sample with the advanced data sample and the delayed data sample. The method may also include performing an action based on the comparison.

Various embodiments may include a method for reducing timing errors in a memory device. The method may include obtaining a clock signal and obtaining a data signal. The method may also include performing operations at the memory device based on the data signal. The method may also include, while the operations are ongoing, without interrupting the operations, one or more of outputting verified data samples and adjusting the clock signal to more closely align with the data signal.

Various embodiments may include a microelectronic device. The microelectronic device may include a delay module configured to provide an advanced clock signal, a clock signal, and a delayed clock signal based on an incoming clock signal. The microelectronic device may also include two or more samplers communicatively connected to the delay module. The two or more samplers may be configured to: sample a data signal according to the clock signal to obtain a data sample; sample the data signal according to the advanced clock signal to obtain an advanced data sample; and sample the data signal according to the delayed clock signal to obtain a delayed data sample. The microelectronic device may also include a majority-decision module communicatively connected to the one or more samplers. The majority-decision module may be configured to compare the data sample to each of the advanced data sample and the delayed data sample.

Various embodiments may include a system. The system may include at least one input device, at least one output device, at least one processor device operably coupled to the input device and the output device, and at least one memory device operably coupled to the at least one processor device. The at least one memory device may include a delay module configured to provide an advanced clock signal, a clock signal, and a delayed clock signal based on an incoming clock signal. The at least one memory device may also include two or more samplers communicatively connected to the delay module. The two or more samplers may be configured to: sample a data signal according to the clock signal to obtain a data sample; sample the data signal according to the advanced clock signal to obtain an advanced data sample; and sample the data signal according to the delayed clock signal to obtain a delayed data sample. The at least one memory device may also include a majority-decision module communicatively connected to the one or more samplers. The majority-decision module may be configured to compare the data sample to each of the advanced data sample and the delayed data sample.

In accordance with common practice, the various features illustrated in the drawings may not be drawn to scale. The illustrations presented in the disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

As used herein, the term "device" or "memory device" may include a device with memory, but is not limited to a device with only memory. For example, a device or a memory device may include memory, a processor, and/or other components or functions. For example, a device or memory device may include a system on a chip (SOC).

As used herein, the term "semiconductor" should be broadly construed, unless otherwise specified, to include microelectronic and MEMS devices that may or may not employ semiconductor functions for operation (e.g., magnetic memory, optical devices, etc.).

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. As used herein, "and/or" includes any and all combinations of one or more of the associated listed items.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternative useful combinations of the elements described, will become apparent to those skilled in the art from the description. Such modifications and embodiments also fall within the scope of the appended claims and equivalents.

What is claimed is:

1. A method comprising:
sampling a data signal according to a clock signal to obtain a data sample;
sampling the data signal according to an advanced clock signal to obtain an advanced data sample;
sampling the data signal according to a delayed clock signal to obtain a delayed data sample;
comparing the data sample with the advanced data sample and the delayed data sample;
incrementing or decrementing a counter in response to the comparison;
outputting the advanced data sample or the data sample in response to the data sample matching the advanced data sample and the data sample not matching the delayed data sample;
outputting the delayed data sample or the data sample in response to the data sample not matching the advanced data sample and the data sample matching the delayed data sample;
advancing one or more of the advanced clock signal, the clock signal, and the delayed clock signal in response to the counter exceeding a lower threshold; and
delaying one or more of the advanced clock signal, the clock signal, and the delayed clock signal in response to the counter exceeding an upper threshold greater than the lower threshold.

2. The method of claim 1, further comprising:
outputting the data sample in response to the data sample matching the advanced data sample and the data sample matching the delayed data sample.

3. The method of claim 1, further comprising:
outputting one or more subsequent advanced data samples obtained by sampling the data signal according to the advanced clock signal or one or more subsequent data samples obtained by sampling the data signal according to the clock signal in response to the data sample matching the advanced data sample and the data sample not matching the delayed data sample;
outputting the one or more subsequent data samples in response to the data sample matching the advanced data sample and the data sample matching the delayed data sample; and
outputting one or more subsequent delayed data samples obtained by sampling the data signal according to the delayed clock signal or the one or more subsequent data samples in response to the data sample not matching the advanced data sample and the data sample matching the delayed data sample.

4. The method of claim 1, further comprising:
advancing one or more of the advanced clock signal, the clock signal, and the delayed clock signal in response to the data sample matching the advanced data sample and the data sample not matching the delayed data sample; or delaying one or more of the advanced clock signal, the clock signal, and the delayed clock signal in response to the data sample not matching the advanced data sample and the data sample matching the delayed data sample.

5. The method of claim 1, wherein the incrementing or decrementing the counter comprises:

decrementing the counter when the data sample matches the advanced data sample and the data sample does not match the delayed data sample; or incrementing the counter when the data sample does not match the advanced data sample and the data sample matches the delayed data sample.

6. The method of claim 1, wherein the data signal is one of:

a command signal indicative of an operation to be performed by a memory device;

an address signal indicative of an address of the memory device;

an input signal indicative of data to be stored by the memory device; or an output signal indicative of data stored by the memory device.

7. The method of claim 1, further comprising:

advancing an incoming clock signal to obtain the advanced clock signal;

delaying the advanced clock signal to obtain the clock signal; and delaying the clock signal to obtain the delayed clock signal.

8. The method of claim 1, further comprising selecting the advanced clock signal, the clock signal, or the delayed clock signal for future sampling based on comparing the data sample with the advanced data sample and the delayed data sample.

9. A method for reducing timing errors in a memory device, the method comprising:

obtaining a clock signal;

obtaining a data signal;

performing operations at the memory device based on the data signal;

sampling the data signal according to the clock signal to obtain a data sample;

sampling the data signal according to an advanced clock signal to obtain an advanced data sample;

sampling the data signal according to a delayed clock signal to obtain a delayed data sample;

comparing the data sample with the advanced data sample and the delayed data sample;

incrementing or decrementing a counter in response to the comparison; and while the operations are ongoing, without interrupting the operations, outputting the advanced data sample, the data sample, or the delayed data sample responsive to the comparison and advancing one or more of the advanced clock signal, the clock signal, and the delayed clock signal in response to the counter exceeding a lower threshold and delaying one or more of the advanced clock signal, the clock signal, and the delayed clock signal in response to the counter exceeding an upper threshold greater than the lower threshold.

10. The method of claim 9, wherein outputting the advanced data samples comprises:

outputting, based on the comparison, one of: one or more subsequent advanced data samples, one or more subsequent data samples, or one or more subsequent delayed data samples, and wherein adjusting the clock signal comprises adjusting, based on the comparison, a delay for one or more of the advanced clock signal, the clock signal, and the delayed clock signal.

11. The method of claim 9, wherein outputting the advanced data samples comprises outputting verified data samples at recurring intervals and adjusting the clock signal comprises adjusting the clock signal at recurring intervals.

12. A microelectronic device comprising:

a delay module comprising circuitry configured to provide an advanced clock signal, a clock signal, and a delayed clock signal based on an incoming clock signal;

two or more samplers comprising circuitry communicatively connected to the delay module, the two or more samplers configured to:

sample a data signal according to the clock signal to obtain a data sample;

sample the data signal according to the advanced clock signal to obtain an advanced data sample;

sample the data signal according to the delayed clock signal to obtain a delayed data sample; and a majority-decision module comprising circuitry communicatively connected to the one or more samplers, the majority-decision module configured to:

compare the data sample to each of the advanced data sample and the delayed data sample;

output, responsive to the comparison, one of the advanced data sample, the data sample, or the delayed data sample;

increment or decrement a counter in response to the comparison; and cause the delay module to advance one or more of the advanced clock signal, the clock signal, and the delayed clock signal in response to the counter exceeding a lower threshold and delay one or more of the advanced clock signal, the clock signal, and the delayed clock signal in response to the counter exceeding an upper threshold greater than the lower threshold.

13. The microelectronic device of claim 12, wherein the majority-decision module is further configured to one or more of:

determine, based on the comparison, to output one of: one or more subsequent advanced data samples, one or more subsequent data samples, or one or more subsequent delayed data samples; or adjust, based on the comparison, one or more of the advanced clock signal, the clock signal, and the delayed clock signal.

14. The microelectronic device of claim 12, further comprising a multiplexer communicatively connected to the majority-decision module and to the two or more samplers, the multiplexer configured to output one of the advanced data sample, the data sample, or the delayed data sample based on the comparison.

15. The microelectronic device of claim 12, further comprising a multiplexer communicatively connected to the majority-decision module and to the two or more samplers, the multiplexer configured to provide to one of the two or more samplers one of the advanced clock signal, the clock signal, or the delayed clock signal based on the comparison.

16. The microelectronic device of claim 12, wherein the delay module comprises a delay chain with multiple tap points and wherein the delay module is configured to, based on the comparison, use a tap point of the multiple tap points to provide a delay for one or more of the advanced clock signal, the clock signal, and the delayed clock signal.

17. The microelectronic device of claim 12, wherein the majority-decision module comprises a counter configured to increment or decrement based on the comparison and the majority-decision module is configured to adjust a delay for one or more of the advanced clock signal, the clock signal, and the delayed clock signal based on the comparison and in response to the counter exceeding a threshold.

18. The microelectronic device of claim 12, wherein the one or more samplers comprises:
    a first sampler comprising circuitry configured to sample the data signal each sampling period according to one of the advanced clock signal, the clock signal or the delayed clock signal; and
    a second sampler comprising circuitry configured to sample the data signal according to the advanced clock signal at a first time and to sample the data signal according to the delayed clock signal at a second time.

19. A system, comprising:
    at least one input device;
    at least one output device;
    at least one processor device operably coupled to the input device and the output device; and
    at least one memory device operably coupled to the at least one processor device, the at least one memory device comprising:
        a delay module comprising circuitry configured to provide an advanced clock signal, a clock signal, and a delayed clock signal based on an incoming clock signal;
        two or more samplers comprising circuitry communicatively connected to the delay module, the two or more samplers configured to:
    sample a data signal according to the clock signal to obtain a data sample;
    sample the data signal according to the advanced clock signal to obtain an advanced data sample; and
    sample the data signal according to the delayed clock signal to obtain a delayed data sample;
    a majority-decision module comprising circuitry communicatively connected to the one or more samplers, the majority-decision module configured to:
    compare the data sample to each of the advanced data sample and the delayed data sample;
    output the advanced data sample or the data sample in response to the data sample matching the advanced data sample and the data sample not matching the delayed data sample;
    output the delayed data sample or the data sample in response to the data sample not matching the advanced data sample and the data sample matching the delayed data sample;
    increment or decrement a counter in response to the comparison; and
    cause the delay module to advance one or more of the advanced clock signal, the clock signal, and the delayed clock signal in response to the counter exceeding a lower threshold and delay one or more of the advanced clock signal, the clock signal, and the delayed clock signal in response to the counter exceeding an upper threshold greater than the lower threshold.

\* \* \* \* \*

UNITED STATES PATENT AND TRADEMARK OFFICE
CERTIFICATE OF CORRECTION

PATENT NO. : 12,437,826 B2  
APPLICATION NO. : 17/385340  
DATED : October 7, 2025  
INVENTOR(S) : Takehiro Hasegawa et al.

Page 1 of 1

It is certified that error appears in the above-identified patent and that said Letters Patent is hereby corrected as shown below:

In the Specification

| | | |
|---|---|---|
| Column 4, | Line 67, | change "and/or 10 timing" to --and/or IO timing-- |
| Column 5, | Line 16, | change "example, 10 timing" to --example, IO timing-- |
| Column 5, | Lines 17-18, | change "LCLK. 10 timing" to --LCLK. IO timing-- |
| Column 5, | Lines 19-20, | change "internal to 10 timing" to --internal to IO timing-- |
| Column 13, | Lines 18-19, | change "to advance one or more of one or more of advanced" to --to advance one or more of advanced-- |

Signed and Sealed this  
Thirteenth Day of January, 2026

John A. Squires  
*Director of the United States Patent and Trademark Office*